(12) United States Patent
Kalinowski et al.

(10) Patent No.: US 8,991,491 B2
(45) Date of Patent: Mar. 31, 2015

(54) INCREASING ENHANCED OIL RECOVERY VALUE FROM WASTE GAS

(75) Inventors: David Kalinowski, Sugar Land, TX (US); Steven Higgens, Houston, TX (US)

(73) Assignees: Siemens Energy, Inc., Orlando, FL (US); Chevron U.S.A. Inc., San Ramon, CA (US)

( * ) Notice: Subject to any disclaimer, the term of this patent is extended or adjusted under 35 U.S.C. 154(b) by 753 days.

(21) Appl. No.: 13/046,363

(22) Filed: Mar. 11, 2011

(65) Prior Publication Data
US 2012/0061085 A1  Mar. 15, 2012

Related U.S. Application Data

(60) Provisional application No. 61/317,534, filed on Mar. 25, 2010.

(51) Int. Cl.
*E21B 49/00* (2006.01)
*E21B 41/00* (2006.01)
*E21B 43/16* (2006.01)

(52) U.S. Cl.
CPC .......... *E21B 41/0071* (2013.01); *E21B 43/164* (2013.01)
USPC ........ 166/250.1; 166/402; 166/403; 166/267; 166/268

(58) Field of Classification Search
USPC .............. 166/250.1, 402, 277, 267, 272, 268, 166/403; 507/277
See application file for complete search history.

(56) References Cited

U.S. PATENT DOCUMENTS

| | | | |
|---|---|---|---|
| 3,065,790 A | 11/1962 | Holm | |
| 3,075,918 A | 1/1963 | Holm | |
| 4,224,992 A | 9/1980 | Comberiati et al. | |
| 4,299,286 A | 11/1981 | Alston | |
| 4,330,038 A | 5/1982 | Soukup et al. | |
| 4,344,486 A | 8/1982 | Parrish | |
| 4,499,946 A | 2/1985 | Martin et al. | |
| 4,546,829 A | 10/1985 | Martin et al. | |
| 4,609,043 A | 9/1986 | Cullick | |
| 4,664,190 A * | 5/1987 | Carpentier | 166/267 |
| 4,683,948 A | 8/1987 | Fleming | |
| 4,830,112 A * | 5/1989 | Erickson | 166/304 |
| 6,357,526 B1 * | 3/2002 | Abdel-Halim et al. | 166/272.3 |
| 2011/0226010 A1 * | 9/2011 | Baxter | 62/619 |
| 2011/0268618 A1 * | 11/2011 | Finkenrath | 422/169 |

\* cited by examiner

*Primary Examiner* — Zakiya W Bates
*Assistant Examiner* — Silvana Runyan
(74) *Attorney, Agent, or Firm* — Andrews Kurth LLP

(57) ABSTRACT

The present invention relates to producing oil from an oil-bearing geological formation using a selection process. The process includes selecting a treatment option such as carbon dioxide flooding for enhancing oil recovery from a geological formation in a remote location. Various characteristic properties such as a physical or chemical property of the oil or rock may be used in the selection process and the carbon dioxide may be captured from a combustion process.

20 Claims, 1 Drawing Sheet

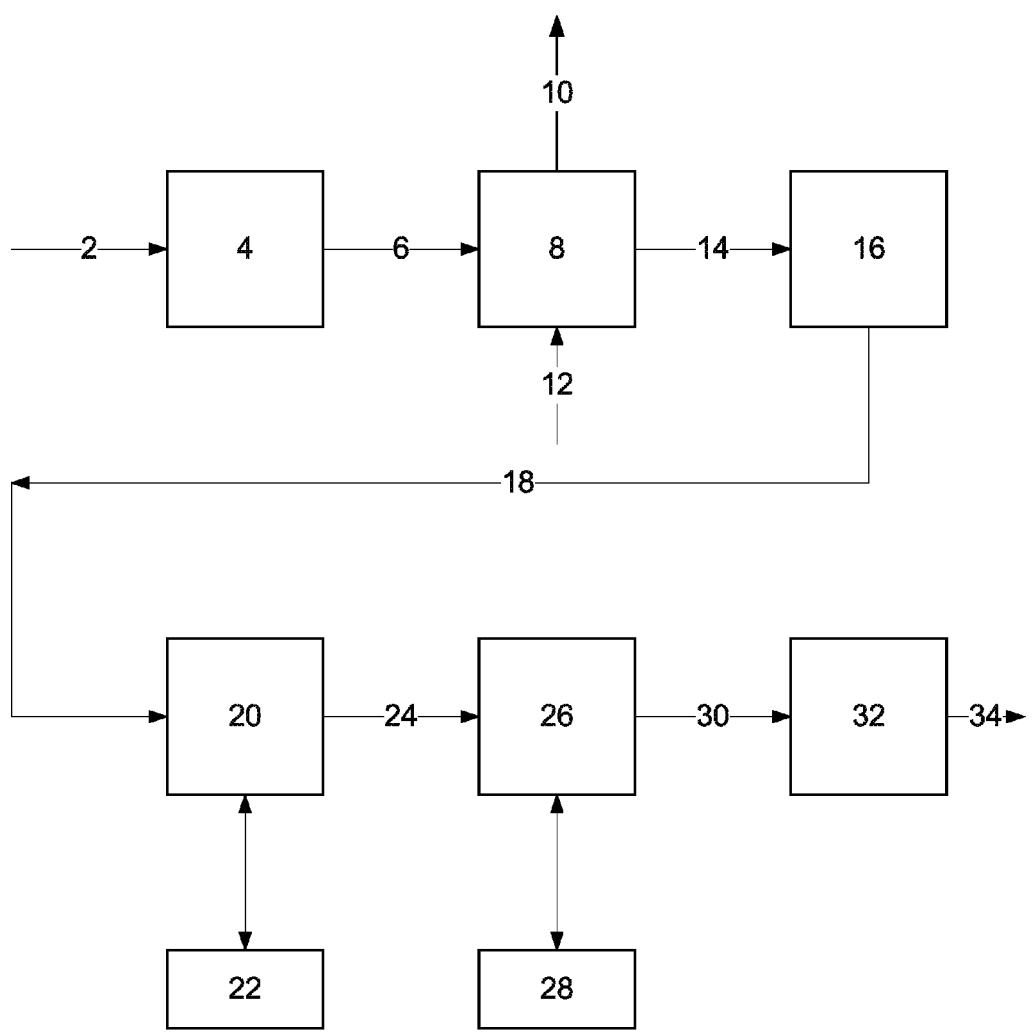

INCREASING ENHANCED OIL RECOVERY VALUE FROM WASTE GAS

CROSS-REFERENCE TO RELATED APPLICATIONS

The present application for patent claims priority to U.S. Provisional Patent Application 61/317,534, filed Mar. 25, 2010, the contents of which are herein incorporated by reference in their entirety.

BACKGROUND OF THE INVENTION

The recovery of oil from subterranean oil-bearing strata is accomplished by employing one or more primary recovery procedures, which are sometimes followed by one or more secondary and tertiary recovery procedures. These secondary and tertiary procedures may be referred to as enhanced oil recovery procedures. Primary oil recovery is usually achieved by penetrating the oil-bearing earth formation with one or more wells and recovering the oil from these wells by utilizing the natural pressure in the subterranean earth strata. In some situations, however, the oil flows too slowly to a producing well, if at all, to be economically viable. When the viscosity of the oil is too high, the reservoir permeability too low, or when the well has been largely depleted, additional physical and/or chemical treatments may be used for recovering additional oil.

The availability of the means for physically and/or chemically treating the formation to increase oil production is particularly limited in remote, desert locations, where the infrastructure to provide the needed materials is generally scarce and expensive. Much of what is needed for improving the recovery of oil from a formation in a remote location must be transported long distances to the site, at significant expense and with some environmental impact. There remains a need for an improved method for selecting the best treatment option for enhancing oil production in a remote location.

SUMMARY OF THE INVENTION

According to the invention, a process is provided for producing oil from an oil-bearing geological formation, comprising quantifying at least one characteristic property relating to oil production from an oil-bearing geological formation through surface facilities located in a remote location; identifying at least one treatment option related to the at least one characteristic property for increasing the oil recovery rate from the geological formation; quantifying at least one treatment agent needed for each treatment option, and further quantifying each treatment agent that is available within or can be produced at the remote location; selecting a treatment option for applying to the geological formation; and applying the select treatment option for enhancing the oil recovery from the formation.

In an embodiment, the process for producing oil from a remote oil-bearing geological formation in a desert location comprises estimating the increased oil production to be expected with the use of carbon dioxide flooding as a treatment option for enhancing oil recovery from an oil-bearing geological formation; identifying at least one local source of natural gas, that is currently being flared, as a source of carbon dioxide; quantifying the environmental impacts and costs of using the local source of natural gas and the environmental impacts and costs of importing purified carbon dioxide from a distant source; and selecting carbon dioxide flooding as the treatment option for enhancing oil recovery from the oil-bearing geological formation, wherein at least a portion of the carbon dioxide is recovered from a natural gas flaring process.

DETAILED DESCRIPTION OF THE INVENTION

As used herein, a production well is a well through which oil is carried from an oil-bearing geological formation to the earth's surface, whether the surface is water or land. Surface facilities are provided for handling and processing the oil from the formation as it arrives on the surface. As used herein, an injection well is a well through which a treatment agent is passed from the surface facilities and into the geological formation. The treatment agent is provided to the geological formation for increasing the flow of oil from the formation. In embodiments, a well is alternatively employed in a producing and an injection mode. In such operations, sometimes termed as "huff and puff", the well is alternatively employed for injecting a material into the formation to enhance the flow of fluids from the formation to the well; process conditions within the well are then adjusted to permit oil to flow into the well, from where it is withdrawn to surface facilities.

As used herein, "heavy oil" is high viscosity oil that, under normal formation conditions, will flow slowly, if at all, from the formation to a production well, resulting in relatively low oil production rates.

As used herein, "oil" refers to an organic material which originates in a geological formation, regardless of its phase. Under some formation conditions of temperature and/or pressure, the oil may be in a solid phase. Under some conditions, the oil may be in a very heavy liquid phase that flows slowly, if at all. Under some conditions, the oil may be in a liquid phase which flows with the application of a normal pressure driving force. Under some conditions, the oil may at least partially volatilize to produce a gaseous phase.

In embodiments, the process is directed to oil production from an oil-bearing geological formation using surface facilities that are in a remote location. In one aspect, the remote location is at a distance from human habitation, or at a location that is serviced and operated by a single-purpose community, with the population of the single-purpose community being either directly dedicated to oil production or indirectly dedicated to providing goods and services to maintain community infrastructure and the oil production processes. In such a single-purpose community, petroleum products from the oil production process are the only wealth generating export from the single-purpose community. Oil production in the single-purpose community may involve the use of a multiplicity of wells, serviced by, but not necessarily located in the community. An example remote location is in a desert, oceanic or arctic region. In a specific example, the remote location is in a desert region. As used herein, "desert" takes its usual meaning as a barren area of land, especially one with limited water resources. As used herein, "local" takes its usual meaning with reference to the remote location, and refers to being at, or near, the remote location.

The process for producing oil from an oil-bearing geological formation includes, at least in part, activities for increasing oil production rates from the formation. Further, the process for producing oil from an oil-bearing geological formation comprises quantifying at least one characteristic property relating to oil production from the oil-bearing geological formation through surface facilities located in a remote location. In embodiments, the at least one characteristic property relating to oil production comprises at least one of a physical property of the oil within the geological formation; a chemical property of the oil within the geological formation; a physical property of the rock matrix within the geological formation; a chemical property of the rock matrix within the geological formation; and an oil production rate profile from the geological formation.

In some such embodiments, the physical property of the oil is viscosity, pour point or boiling point of the oil within the geological formation. For example, the viscosity of the oil within the geological formation may be sufficiently high to adversely affect the recovery of oil from the formation. Exemplary, non-limiting viscosities of the oil which is recovered from the formation using the select treatment option is greater than 30 cSt, or greater than 50 cSt or even greater than 70 cSt at 100° C. The pour and/or boiling point of the oil may be further indications of the ease with which the oil will flow within the formation. Exemplary, non-limiting pour points of the oil which is recovered from the formation using the select treatment option is greater 50° C. or greater than 75° C. or even greater than 100° C. An exemplary, non-limiting boiling point of the oil which is recovered from the formation using the select treatment option is greater than 200° C., or greater than 250° C. or even greater than 300° C. These parameters may be further used as in indication of the effectiveness of various enhanced treatments for increasing oil production rates.

Chemical properties of the oil in the formation may be used to identify a suitable treatment option. In some such embodiments, the chemical property of the oil is the asphaltene content, the polynuclear aromatic content or the heteroatom content of the oil within the geological formation. The asphaltene content or the polynuclear aromatic content may be an indicator of the solubility of the oil is chemical solvents or the extent of the interaction with a chemical agent, or the resultant viscosity reduction in combination with carbon dioxide. An exemplary, non-limiting asphaltene content of the oil which is recovered from the formation using the select treatment option is greater than 2% by weight or greater than 5% by weight or even greater than 10% by weight. An exemplary, non-limiting polynuclear aromatic content of the oil which is recovered from the formation using the select treatment option is greater than 2% by weight or greater than 5% by weight or even greater than 10% by weight. The heteroatom content of the oil may be a predictor of the corrosivity of the oil. An exemplary non-limiting heteroatom content of the oil which is recovered from the formation using the select treatment option is greater than 1% by weight total sulfur, or greater than 2% total sulfur or even greater than 4% total sulfur.

In embodiments, the characteristic property comprises a property of the geological formation. Non-limiting example properties include the formation temperature, pressure, depth, the average formation porosity, the average formation permeability, or the composition of the inorganic matrix within the formation. The composition of the inorganic rock matrix within the formation may indicate an expected absorption and reaction potential of the rock matrix with water, carbon dioxide and chemical agents useful for enhancing oil production. Such information may be used to select a treatment option which can be employed to inexpensively and safely enhance oil production from the formation. Tight formations are generally characterized by low porosity or permeability of the rock matrix within the geological formation. Reservoir and geological formation models, in combination with analysis of the particular geological formation, may provide quantitative information on the relative porosity and/or permeability of the formation. In some embodiments, laboratory data which provides information on potential extraction rates of oil from a particular formation are also used. Such information may then be used to quantify the benefit for employing enhanced methods for recovering oil from the geological formation.

In some embodiments, the oil production rate profile comprises one or more of an estimate of the expected oil production from the formation; an estimate of the amount of recoverable oil which remains in the formation; an estimate of the current oil production rate from the formation; and an estimate of the increased oil production to be expected with the use of a select treatment option. Thus, the characteristic property may comprise an oil production rate profile from the geological formation, which provides a comparison of current production rates with historical production rates. In some situations, the oil-bearing geological formation has been produced for sufficient time that the oil in the formation is relatively depleted. Any significant decrease in production in the absence of enhanced recovery methods may indicate the desirability of using an enhanced method to preserve the integrity of the oil-bearing formation.

The process for producing oil from an oil-bearing geological formation further comprises identifying at least one treatment option related to the at least one characteristic property for increasing the oil recovery rate from the geological formation. In general, a suitable treatment option is applied to the geological formation to increase the mobility of the oil in the formation. In embodiments, the at least one treatment option is selected from hydraulic fracturing, water flooding, gas injection and gas pressurization, thermal flooding, steam flooding, carbon dioxide flooding and chemical injection.

Hydraulic fracturing is a method for using very high pressure fluids to create fractures that extend from the borehole of a well into the geological formation. Each fracture, which in embodiments is kept open using a proppant such as sand or ceramic beads, provides a conductive path connecting a larger area of the formation to the well, thereby increasing the area from which fluids can be produced from the formation. Water is an example treatment agent for the hydraulic fracturing method.

Water flooding is a method which includes injecting water into the formation at high pressure to displace the oil in the formation and to sweep it towards the oil production well. Water flooding generally requires very large quantities of water as a treatment agent. In desert settings, where the water may be scarce and must be imported from a distance, water flooding may be a relatively expensive option. Alternatively, using local water may deprive local communities and businesses of the valuable resource.

Gas pressurization is a method which includes injecting a gaseous material into the formation to drive the oil in the formation toward the production well. In embodiments, the gas injection drive is facilitated by a pressure differential between the injected gas and the formation pressure. Typically the gas is injected at a pressure that is higher than the formation pressure. Non-limiting exemplary gas pressures are between 10 psi and 5000 psi greater than the formation pressure. In some such embodiments, the gas pressures are between 100 psi and 1500 psi, or between 200 psi and 1000 psi greater than the formation pressure. Non-limiting examples of gases which may be used to increase oil production include nitrogen, helium, argon, carbon monoxide, methane, carbon dioxide, steam, syngas, flue gas, exhaust gas and hydrogen. In one aspect, pressurized gas increases formation pressure, displaces oil and sweeps it to the production well. In a further aspect, heated gas increases the thermal energy of the formation and reduces the viscosity of the oil in the formation.

In embodiments, gases used for gas pressurization are produced at the surface facilities or in a local facility. Such production facilities include, for example, the removal of oxygen (or air) from the gases. For example, nitrogen may be purified on site using an air separation process. Particularly in the case of carbon dioxide, which is generally recovered from the flue gas generated in an oxidation process, removal of at least a portion of the nitrogen contained therein is important for producing an effective treatment agent.

In embodiments, gases used for gas pressurization are purchased from a local facility or from a distant location. In a remote location, such as in a desert setting, gases are often purchased from a distant location. Exemplary gases that would generally be purchased in such a setting include nitrogen, carbon dioxide, helium, argon and hydrogen.

Carbon dioxide flooding is a particular form of gas injection. Under some conditions of formation temperature, pressure and crude oil composition, gas injection relies on the phase behavior of the gas/oil mixture to enhance oil displacement and recovery. For example, high pressure carbon dioxide interacts with the oil in the formation to reduce the oil viscosity and increase production. At the same time, the oil with the lowered viscosity carries the carbon dioxide to the surface, where it can be easily removed from the oil and reused.

In embodiments, carbon dioxide used for carbon dioxide flooding is recovered from a surface combustion process involving the oxidation of a carbon based fuel, recovery of the flue gas generated during oxidation, following by treatment of the flue gas to produce a purified carbon dioxide stream. The purified carbon dioxide stream contains at least 50 mole % carbon dioxide. Exemplary streams contain at least 60 mole or at least 70 mole % or at least 80 mole % or at least 90 mole % or at least 95 mole % or even at least 99 mole % carbon dioxide.

In embodiments, at least a portion the carbon based fuel from which the carbon dioxide is generated is available locally, and will include any combustible carbon-based material, including biomass, coal, liquid fuels, solid fuels, oil-bearing shale, and gases such as natural gas.

Pressurizing the formation with carbon dioxide has several advantages, depending on the formation conditions. In an embodiment, the formation is pressurized with carbon dioxide at the formation pressure, and at a temperature below the vaporization pressure of the carbon dioxide. Liquid carbon dioxide fills the voids within the formation, and serves to apply a pressure driving force to the oil in the formation. The pressure within the formation is gradually reduced, causing an increasing proportion of the carbon dioxide to vaporize; the vapor phase carbon dioxide dissolves in the oil in the formation and reduces the oil viscosity. In some embodiments, the reduced viscosity oil is driven to the production well using a following water flood, optionally a carbonated aqueous liquid flood.

In embodiments, the carbon dioxide is generated by combustion of natural gas, which is recovered from the geological formation or from a nearby geological formation that is producing petroleum products. Carbon dioxide flooding requires large amounts of purified carbon dioxide. Transporting liquid carbon dioxide by train, truck or pipeline significantly increases its cost, particularly if roads must be built or upgraded, or pipelines must be installed. Having a local source of natural gas, for example, greatly decreases the operating costs by reducing or eliminating costs for transporting natural gas from a more remote site. In some such embodiments, the carbon dioxide is recovered from a flaring process. In an exemplary flaring process, natural gas which is produced along with liquid petroleum is considered a low-value product, particularly when the well is at a remote location, such as in a desert location. Getting such natural gas to markets may be uneconomical, and the natural gas is flared to reduce atmospheric emissions of the hydrocarbon. Using at least a portion of the carbon dioxide from a flaring process significantly reduces the cost of the carbon dioxide, and further reduces the environmental impact of the flaring process.

Thermal flooding is a method which involves providing thermal energy to the geological formation to increase oil production from the formation. In one embodiment, sufficient heat is provided to the formation to reduce the viscosity of oil contained the formation. In other embodiments, sufficient heat energy is provided to the formation to increase the fracturing within the formation, thereby increasing oil production. Steam flooding and cyclic steam stimulation are two processes employing steam to increase the temperature of at least a portion of the formation.

In embodiments, heat is generated within the formation, using, for example, electrical heating, natural gas-fired heating or heat generated from a flame front within the formation, maintained by pumping an oxygen containing gas, such as air, into the burning portion of the formation to maintain the flame. In embodiments, heat energy produced in surface facilities is transported into the formation.

In steam flooding, steam is injected into the well to heat the oil in the formation, thereby decreasing its viscosity to enhance oil flow through the formation and toward the production wells. In one embodiment, the formation is heated by steam which is pumped at high pressures from a surface heater into the formation. The pressure will generally be equal to or greater than the formation pressure. Non-limiting exemplary stream pressures are between 1 psi and 5000 psi, or between 10 psi and 1500 psi, or between 50 psi and 1000 psi greater than the formation pressure. The steam temperature will be selected so that the steam remains a vapor at the formation pressure. In one embodiment, the steam is injected under supercritical conditions into the formation. Cyclic Steam Stimulation may include a Huff and Puff method, involving steam injection into a well to achieve a desired temperature and pressure within the well, soaking at elevated temperatures for a certain amount of time to heat the oil in the formation surrounding the well, and then producing oil from the well. The cycle may be repeated when production decreases to a predetermined low level. In some embodiments, the steam is permitted to condense within the formation; the resultant liquid water forms a liquid within the formation and aids in increasing the oil fluidity. Condensed steam provides further benefits by physically displacing oil toward the production wells.

Steam flooding generally requires very large quantities of water and a source of heat for generating the steam. In desert settings, where the water must be imported from a distance, steam flooding may be relatively expensive. Alternatively, using local water may deprive local communities and businesses of the valuable resource.

Chemical extraction of oil from an oil-bearing geological formation may be designed for one of several different objectives. The chemical may be injected into the formation to reduce the oil viscosity. Polymers such as ethoxylated octylphenol-, dodecylphenol-, tetradecylphenol- and hexadecylphenol-formaldehyde polymeric materials may be injected for that purpose. Polymers may also be added to increase the viscosity of water that is injected along with the chemicals, in order to improve the water drive. Detergents may be added to lower the capillary pressure that impedes oil droplets from moving through the formation. Other non-ionic polymers and surfactants, such as sulfonates and alkyl aromatics, may be used to reducing interfacial tension between oil and water phases, thus allowing the recovery of oil trapped in smaller pores.

Chemicals provided to a geological formation in a remote location are manufactured and formulated elsewhere, and must be transported to the site. In addition, handling chemicals in a remote location requires specialists on site to avoid adverse human and/or environmental impacts.

In embodiments, one or more treatment options may be indicated by the size of the oil-bearing portion of the formation. Alternatively, one or more treatment options may be indicated by the native temperature of the formation. Alternatively, one or more treatment options may be indicated by the porosity of the oil-bearing portion of the formation. Alternatively, one or more treatment options may be indicated by the depth of the formation. Alternatively, one or more treatment options may be indicated by the amount of formation water which is coincident with the oil-bearing portion of the formation. Alternatively, one or more treatment options may be indicated by the type of rock within the formation.

In an embodiment, therefore, an oil-bearing geological formation in a remote location, such as in a desert location, is analyzed and found to be producing reduced quantities of oil. Treatment options selected from hydraulic fracturing, water flooding, gas pressurization, thermal flooding, steam flooding, gas injection, carbon dioxide flooding and chemical injection are identified as potential treatment options to increase oil production from the formation. A treatment agent suitable for use with a treatment option is one or more of carbon dioxide, nitrogen, natural gas, water or an aqueous solution, or a chemical suitable for dissolving, converting or reducing the viscosity of oil in an oil-bearing geological formation.

The process for producing oil from an oil-bearing geological formation comprises quantifying at least one treatment agent needed for each treatment option, and further quantifying each treatment agent that is available (i.e. produced, recovered, prepared, manufactured or synthesized) at the remote location. In embodiments, the step of quantifying each treatment agent that is available at the remote location comprises one or more of identifying local processes necessary for performing each treatment option; quantifying the at least one treatment agent useful to perform each treatment option and determining the local availability of each treatment agent; determining other local demands for one or more of these treatment agents; and determining the local availability of a skilled workforce for conducting each treatment option. For example, a treatment agent such as water for hydraulic fracturing, water flooding and steam flooding may be produced from local wells, from local surface streams or from local surface bodies of water. In another example, carbon dioxide for carbon dioxide flooding is produced within the remote location by recovering the carbon dioxide from a natural gas flaring process. In an exemplary process, natural gas that is produced from a well at the remote location is flared, and the product carbon dioxide is recovered and purified to make a purified carbon dioxide product. In contract, the carbon dioxide that is generated from flaring natural gas in the convention process is vented to the atmosphere. In further contrast, carbon dioxide is imported from a distant location, using, for example, truck, train or pipeline transportation, in a conventional process.

In embodiments, the process for producing oil from an oil-bearing geological formation further comprises selecting at least one treatment option for increasing the oil recovery from the oil-bearing geological formation. A primary factor in selecting one of the treatment options for application to the particular target formation is provided by a cost/benefit analysis. In some situations, the cost/benefit analysis is expanded to include long-term social and both local and global environmental impacts. Key considerations in this long-term view include the local availability of scarce resources such as water, energy, and a skilled workforce. This detailed analysis involves weighing all of the options and details of each option which were identified and at least partially quantified in the process. Thus, in embodiments, the selection process includes one or more of determining the effectiveness of each treatment option for increasing oil production from the geological formation; determining the cost of each treatment option; quantifying the environmental requirements and environmental impacts of each treatment option; balancing the effectiveness of each treatment option, the cost of each treatment option and the availability of a local skilled workforce against other local demands for the treatment agents and the environmental requirements and environmental impacts of each treatment option; and selecting the treatment option for applying to the geological formation.

The treatment agents which may be considered include any materials that are provided to the process to make the enhanced oil recovery process possible. Basic treatment agents comprise one or more of carbon dioxide, nitrogen, natural gas, water or an aqueous solution, or a chemical suitable for dissolving, converting or reducing the viscosity of oil in an oil-bearing geological formation. Additional treatment agents may include, for example, fuel for power and heat, and construction materials for construction, maintenance and repairs, etc. Local demands of each treatment agent may be considered as competing demands for the treatment agents in employment of a treatment option. Such local demands include, for example, industrial demands, community demands, residential demands or agricultural demands. Water obviously has a multitude of uses in the community, in homes, in industry and in agriculture beyond its use for enhancing oil recovery from a local geological formation. Natural gas has uses as a local supply of energy and heat. Specific chemicals for chemical injection, nitrogen for gas injection or carbon dioxide for carbon dioxide flooding, may have fewer local uses outside of enhancing oil recovery.

In a remote desert site, for example, many of the materials which are normally considered for enhancing the oil recovery from a formation are in short supply, and/or must be imported from a distance source, at added cost. Thus, for the water flooding treatment option, the process comprises balancing the availability of water for increasing crude oil recovery against local uses of water for industrial needs, residential needs and agricultural needs. For the thermal flooding option, the process comprises balancing the availability of fuel for generating heat with the value of that fuel as a material of commerce, or as a fuel for use in local industry or for other local community needs. For the steam flooding treatment option, water availability and energy availability must both be considered. For the gas compression option, the process comprises balancing the need for purified gases at high pressure against the energy and capital costs required to produce those high purity, high pressure gases. Importing high pressure nitrogen or carbon dioxide, via truck, train, barge, ship or pipeline significantly increases the cost of enhancing oil production in a remote desert location. Solvent flooding in a remote, desert location again requires that large quantities of chemicals be imported from a remote location before they can be employed to enhance the recovery of oil.

In embodiments, the treatment option is selected from gas pressurization with natural gas and carbon dioxide flooding.

Natural gas is the treatment agent that is useful for both gas pressurization and carbon dioxide flooding. In embodiments, the natural gas is locally available, and the step of balancing the effectiveness of each treatment option further comprises balancing the availability of natural gas for increasing crude oil recovery by direct injection into the oil-bearing geological formation against local requirements for heat, electrical and mechanical energy. In embodiments, the treatment option is carbon dioxide flooding, the treatment agent is carbon dioxide, and the step of selecting comprises balancing the cost of importing purified carbon dioxide from a distant source with recovering purified carbon dioxide from local sources. In embodiments, the step of balancing the effectiveness of carbon dioxide flooding further comprises balancing the environmental impacts of reducing carbon dioxide gaseous emissions with the cost of purifying carbon dioxide from a natural gas flaring process.

The process for producing oil from an oil-bearing geological formation further comprises applying the select treatment option for enhancing the oil recovery from the formation. Applying carbon dioxide flooding as a treatment option comprises recognizing that carbon dioxide can be generated from a local source.

In an embodiments, the needed carbon dioxide is recognized as being available from a local source, such as from natural gas which is produced from the geological formation, or from a nearby oil or gas containing geological formation. In an embodiment of the invention, the carbon dioxide is captured from a combustion process involving flaring natural gas. At least a portion of the carbon dioxide which is generated from a flaring process is purified to a concentration of at least 90 vol % carbon dioxide; the purified carbon dioxide is pressurized and injected into the geological formation. In embodiments, the carbon dioxide is pressurized to a pressure of at least the pressure of the portion of the geological formation into which it is injected. In some such embodiments, the carbon dioxide is pressurized to a pressure of greater than 100 psi, or 250 psi, or 500 psi, or 750 psi or 1000 psi above the pressure of the portion of the geological formation into which it is injected. In embodiments, the carbon dioxide is injected at a pressure such that the carbon dioxide is a liquid at the temperature of the formation in the region of the oil-bearing strata.

The process of the invention is contrasted with a conventional process, including producing natural gas from the oil-bearing geological formation or from another local source of natural gas, providing natural gas to meet local requirements and flaring the remaining natural gas by combustion in air. The process of the invention is further contrasted with a conventional process, including supplying carbon dioxide by one or more transportation means, such as a truck, train, ship, barge or pipeline transportation, and delivered to the geological formation.

In some such embodiments, the process for producing oil from a remote oil-bearing geological formation in a desert location comprises estimating the increased oil production to be expected with the use of carbon dioxide flooding as a treatment option for enhancing oil recovery from an oil-bearing geological formation; identifying at least one local source of natural gas, that is currently being flared, as a source of carbon dioxide; quantifying the environmental impacts and costs of using the local source of natural gas and the environmental impacts and costs of importing purified carbon dioxide from a distant source; selecting carbon dioxide flooding and applying carbon dioxide flooding as the treatment option for enhancing oil recovery from the oil-bearing geological formation, wherein at least a portion of the carbon dioxide is recovered from a natural gas flaring process.

FIG. 1 illustrates an embodiment of the process. Natural gas 2 is passed to inlet manifold and conditioning unit 4. The conditioned gas 6 is then passed to a burner/$CO_2$ generator unit 8. Heat and/or power are recovered at 10, and air is supplied to the burner 8 through 12. Carbon dioxide containing gas 14 is collected in cooled in unit 16 and then passed via line 18 to a carbon dioxide separation process 20. An exemplary process is the Fluor Econamine process, which can produce a 99.8% pure carbon dioxide stream. The treatment chemical is regenerated in 22. A saturated carbon dioxide stream 24 is then passed to a carbon dioxide dehydration process 26, using, for example, a molecular sieve drier. The molecular sieve, in turn is regenerated in 28. Dried carbon dioxide 30 is passed to a carbon dioxide compression stage 32, producing a high pressure carbon dioxide stream 34 at, for example, a total pressure of 2000 psig.

What is claimed is:

1. A process for producing oil from an oil-bearing geological formation, comprising:
    a) quantifying at least one characteristic property relating to oil production from an oil-bearing geological formation through surface facilities located in a remote location;
    b) identifying at least one treatment option related to the at least one characteristic property for increasing the oil recovery rate from the geological formation;
    c) quantifying at least one treatment agent needed for each treatment option, and further quantifying each treatment agent that is available within or can be produced at the remote location;
    d) selecting a treatment option for applying to the geological formation; and
    e) applying the select treatment option for enhancing the oil recovery from the formation, wherein the at least one treatment option comprises carbon dioxide flooding and wherein the carbon dioxide is captured from a combustion process;
    wherein the process further comprises:
        recovering heat, power, or both;
        dehydrating captured carbon dioxide;
        compressing the dehydrated carbon dioxide; and
        injecting the compressed carbon dioxide into the geological formation.

2. The process of claim 1, wherein the at least one characteristic property comprises at least one of:
    a) a physical property of the oil within the geological formation;
    b) a chemical property of the oil within the geological formation;
    c) a physical property of the rock matrix within the geological formation;
    d) a chemical property of the rock matrix within the geological formation; and
    e) an oil production rate profile from the geological formation.

3. The process of claim 2, wherein the oil production rate profile comprises one or more of:
    a) an estimate of the expected oil production from the formation;
    b) an estimate of the amount of recoverable oil which remains in the formation;
    c) an estimate of the current oil production rate from the formation; and
    d) an estimate of the increased oil production to be expected with the use of a select treatment option.

4. The process of claim 1, wherein at least one further treatment option is selected from hydraulic fracturing, water flooding, gas pressurization, thermal flooding, steam flooding, and chemical injection.

5. The process of claim 1, wherein the step of quantifying each treatment agent that is available within or can be produced at the remote location comprises one or more of:
   a) identifying local processes necessary for performing each treatment option;
   b) quantifying the at least one treatment agent useful to perform each treatment option and determining the local availability of each treatment agent;
   c) determining other local demands for one or more of these treatment agents; and
   d) determining the local availability of a skilled workforce for conducting each treatment option.

6. The process of claim 5, wherein the treatment agents comprise one or more of carbon dioxide, nitrogen, natural gas, water or an aqueous solution, or a chemical suitable for dissolving, converting or reducing the viscosity of oil in an oil-bearing geological formation.

7. The process of claim 5, comprising identifying locally available natural gas useful as a treatment agent for increasing the oil recovery rate from the geological formation.

8. The process of claim 1, wherein the step of selecting the treatment option comprises:
   a) determining the effectiveness of each treatment option for increasing oil production from the geological formation;
   b) determining the cost of each treatment option;
   c) quantifying the environmental requirements and environmental impacts of each treatment option;
   d) balancing the effectiveness of each treatment option, the cost of each treatment option and the availability of a local skilled workforce against other local demands for the treatment agents and the environmental requirements and environmental impacts of each treatment option; and
   e) selecting the treatment option for applying to the geological formation.

9. The process of claim 8, wherein the select treatment option is carbon dioxide flooding.

10. The process of claim 9, wherein the carbon dioxide is captured from a combustion process involving flaring natural gas.

11. The process of claim 9, wherein the step of balancing the effectiveness of each treatment option further comprises balancing the cost of importing purified carbon dioxide from a distant source with recovering purified carbon dioxide from local sources.

12. The process of claim 9, wherein the step of balancing the effectiveness of each treatment option further comprises balancing the environmental impacts of reducing carbon dioxide gaseous emissions with the cost of purifying carbon dioxide from a natural gas flaring process.

13. The process of claim 1, wherein the combustion process comprises flaring natural gas.

14. The process of claim 1, wherein the captured carbon dioxide is purified to a concentration of at least 90 vol % carbon dioxide.

15. The process of claim 1, wherein the captured carbon dioxide is purified to a concentration of at least 99.8 mol % carbon dioxide.

16. The process of claim 14, wherein the carbon dioxide is purified using a monoethanolamine solvent.

17. The process of claim 1, wherein the captured carbon dioxide is compressed to a pressure of greater than 100 psi above the pressure of geological formation into which it is injected.

18. The process of claim 1, wherein the captured carbon dioxide is compressed to a pressure of greater than 1000 psi above the pressure of the geological formation into which it is injected.

19. A process for producing oil from a remote oil-bearing geological formation in a desert location comprising:
   a) estimating the increased oil production to be expected with the use of carbon dioxide flooding as a treatment option for enhancing oil recovery from an oil-bearing geological formation;
   b) identifying at least one local source of natural gas, that is currently being flared, as a source of carbon dioxide;
   c) quantifying the environmental impacts and costs of using the local source of natural gas and the environmental impacts and costs of importing purified carbon dioxide from a distant source; and
   d) selecting carbon dioxide flooding as the treatment option for enhancing oil recovery from the oil-bearing geological formation, wherein at least a portion of the carbon dioxide is recovered from a natural gas flaring process, wherein the process further comprises recovering heat, power, or both from the flaring natural gas; wherein the recovered carbon dioxide is purified to a concentration of at least 90 mol % carbon dioxide using a monoethanolamine solvent; and wherein the purified carbon dioxide is pressurized and injected into the oil-bearing geological formation.

20. The process of claim 19, wherein at least one further treatment option is selected from hydraulic fracturing, water flooding, gas pressurization, thermal flooding, steam flooding, and chemical injection.

* * * * *